United States Patent [19]

Wenzel

[11] Patent Number: 5,350,242
[45] Date of Patent: Sep. 27, 1994

[54] BEARING ASSEMBLY FOR A DOWNHOLE MOTOR

[76] Inventor: William Wenzel, 3771 - 74 Avenue, Edmonton, Alberta, Canada, T6B 2T7

[21] Appl. No.: 79,108

[22] Filed: Jun. 17, 1993

[30] Foreign Application Priority Data

Jun. 18, 1992 [CA] Canada ................................. 2071611

[51] Int. Cl.$^5$ .............................................. E21B 4/02
[52] U.S. Cl. ...................................... 384/97; 175/107
[58] Field of Search ...................... 384/97, 92; 175/107

[56] References Cited

U.S. PATENT DOCUMENTS

| | | | |
|---|---|---|---|
| 3,952,816 | 4/1976 | Takano et al. | 175/107 |
| 4,427,079 | 1/1984 | Walter | 175/107 |
| 5,217,080 | 6/1993 | Wenzel et al. | 175/107 |

Primary Examiner—Thomas R. Hannon
Attorney, Agent, or Firm—Davis, Bujold & Streck

[57] ABSTRACT

A bearing assembly for a downhole motor consisting of a plurality of notches in one of an exterior surface of an inner mandrel and an interior surface of a housing. The notches are upwardly inclined from a base. A plurality of pins are disposed between the exterior surface of the inner mandrel and the interior surface of the housing. The pins contact the notches such that the pins travel up the incline on the notches upon relative rotation of the housing and the inner mandrel in a first direction and travel down the incline on the notches upon relative rotation of the housing and the inner mandrel in a second direction. The pins become wedged into locking engagement with the notches thereby preventing relative rotation of the inner mandrel and the housing as the inner mandrel rotates in one of the first direction and the second direction.

3 Claims, 4 Drawing Sheets

BEARING ASSEMBLY FOR A DOWNHOLE MOTOR

The present invention relates to an improvement in a bearing assembly for a downhole motor.

BACKGROUND OF THE INVENTION

Downhole motors are invariably used in tandem with a universal joint connection to a bearing assembly when drilling through rock formations. The bearing assembly translates the eccentric motion of the downhole motor to concentric motion, and assists in bearing radial and axial loading during the drilling operations.

When the drill bit becomes stuck while drilling, it is not possible to rotate the drill string to the right to dislodge the drill bit without overriding and potentially damaging the downhole motor. By rotating the drill string to the right, increased torque can be provided directly to the drill bit to increase the chances of breaking the drill bit loose from its "stuck" position. This is one of a number of situations, in which it would be advantageous to rotate the drill string to the right.

SUMMARY OF THE INVENTION

What is required is a bearing assembly which permits the drill string to be rotated to the right without risk of overriding and potentially damaging the downhole motor.

According to the present invention there is provided an improvement in a bearing assembly for a downhole motor. These bearing assemblies consist of a cylindrical housing having an interior surface and a cylindrical inner mandrel having an exterior surface telescopically received within the housing. Bearing means are disposed between the interior surface of the housing and the exterior surface of the inner mandrel, thereby facilitating relative rotation of the housing and inner mandrel while bearing axial and radial loading. The improvement is comprised of a plurality of notches in one of the exterior surface of the inner mandrel and the interior surface of the housing. A plurality of pins are disposed in the notches. The pins contact the exterior surface of the inner mandrel and the interior surface of the housing, such that the pins travel toward on end of the notches upon relative rotation of the housing and the inner mandrel in a first direction and travel toward the other end of the notches upon relative rotation of the housing and the inner mandrel in a second direction. Means are provided for bringing the pins into locking engagement with the notches thereby preventing relative rotation of the inner mandrel and the housing as the inner mandrel rotates in one of the first direction and the second direction.

One means for bringing the pins into locking engagement with the notches is to have the pins disposed within pockets in the other of the housing and the inner mandrel. The notches are inclined upwardly from a one end which represents a base position. With this configuration, each pin has one end pivotally secured within the pocket and a second end. Biasing means are provided to exert a force biasing the second end of the pins toward the notches. The pins travel freely up the incline on the notches upon relative rotation of the inner mandrel and housing in the first direction. Upon relative rotation of the inner mandrel and the housing in the second direction, the pins travel down the incline on the notches until the pins engage the base of the notch, thereby preventing relative rotation of the inner mandrel and the housing.

An alternative means for bringing the pins into locking engagement with the notches is to ensure that the depth of each notch at the base exceeds the diameter of the pins, and that limited clearance is provided between the interior surface of the housing and the exterior surface of the inner mandrel. The pins travel toward one end of the notch where the pins rotate freely upon relative rotation of the inner mandrel and housing in the first direction. Upon relative rotation of the inner mandrel and the housing in the second direction, the pins travel toward the other end of the notches until the pins become wedged between the interior surface of the housing and the exterior surface of the inner mandrel, thereby preventing relative rotation of the inner mandrel and the housing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1A:
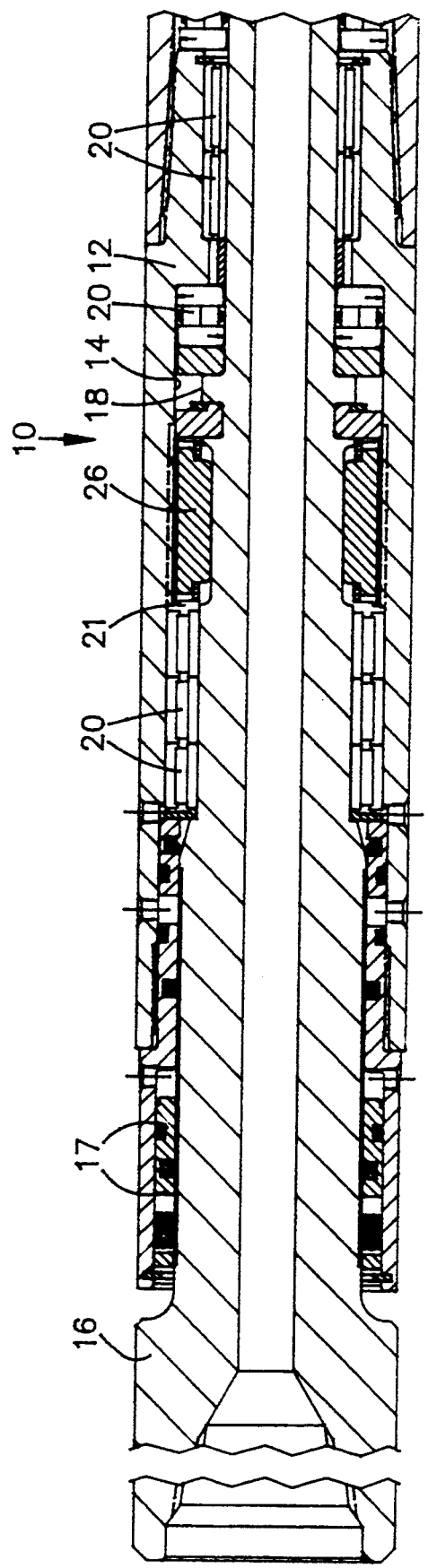
FIGS. 1a and 1b are a longitudinal section view of a bearing assembly constructed in accordance to the teachings of the present invention.

The preferred embodiment, a bearing assembly for a downhole motor generally identified by reference numeral 10, will now be described with reference to FIGS. 1a through 3b. An alternative embodiment of the invention is illustrated in FIG. 4.

Figure 1B:
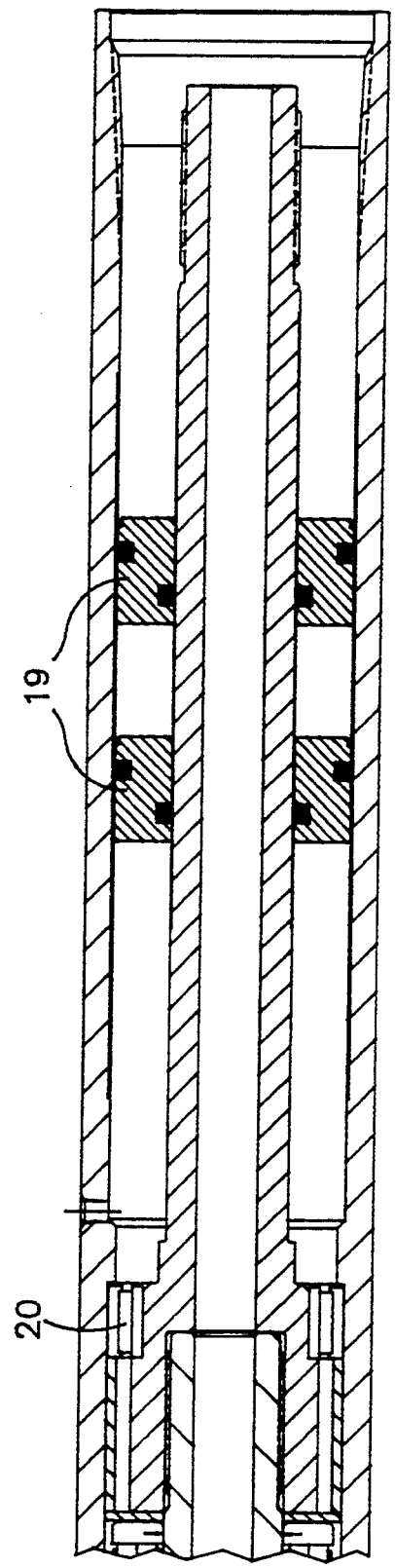

The invention relates to an improvement in bearing assembly 10. Referring to FIGS. 1a and 1b, these bearing assemblies consist of a cylindrical housing 12 having an interior surface 14 and a cylindrical inner mandrel 16 having an exterior surface 18. Inner mandrel 16 is telescopically received within housing 12. Bearings 20 are disposed between interior surface 14 of housing 12 and exterior surface 18 of inner mandrel 16, thereby facilitating relative rotation of housing 12 and inner mandrel 16 while bearing axial and radial loading. Sealing assemblies 17 and 19 prevent abrasive drilling fluids from communicating with bearings 20. Sealing assemblies define opposed ends of a lubricant filled bearing chamber 21.

Figure 2:
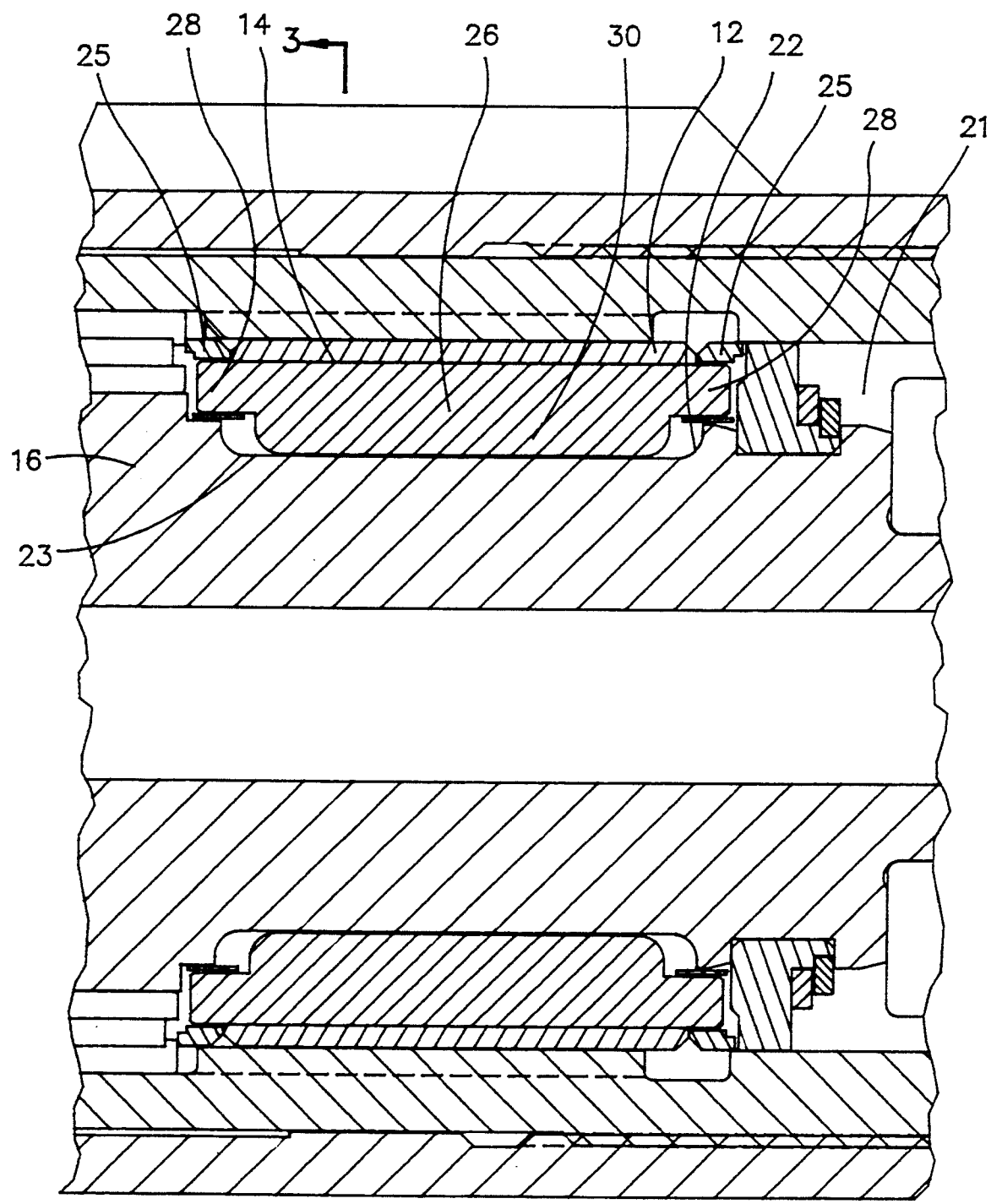
FIG. 2 is a longitudinal section view of a portion of the bearing assembly illustrated in FIG. 1.
Figure 3A:
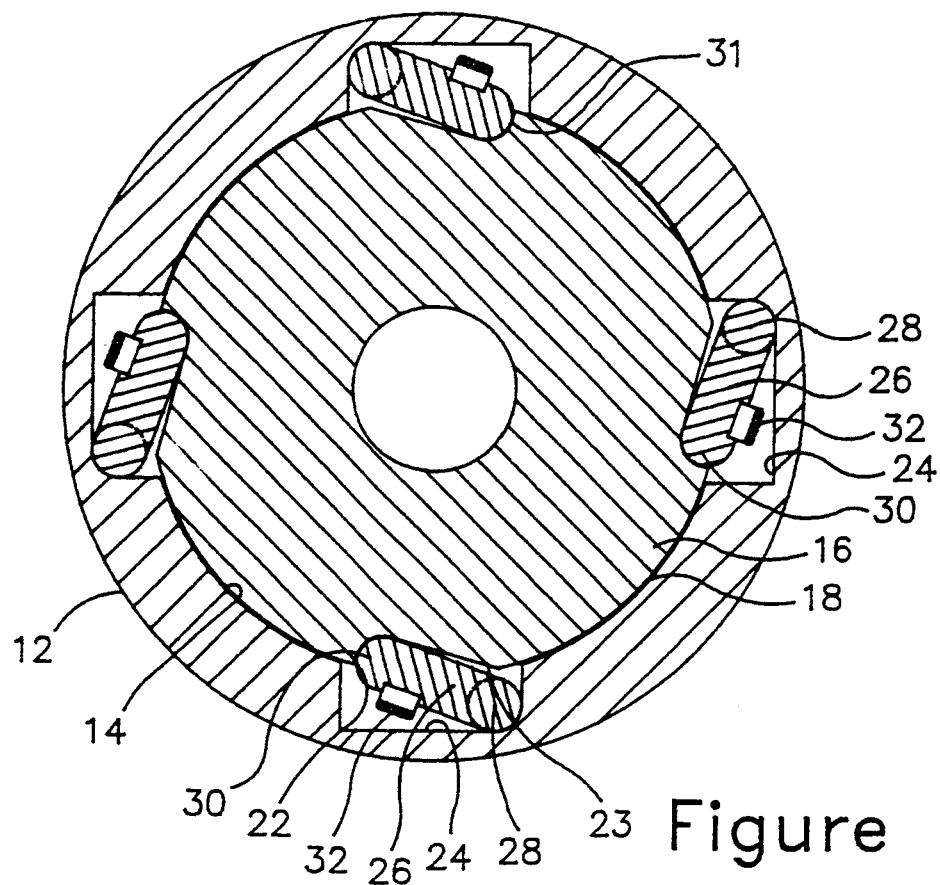
FIG. 3a is a transverse section view of the bearing assembly illustrated in FIG. 1, taken along section lines 3—3 of FIG. 2 with inner mandrel rotating counterclockwise.
Figure 3B:
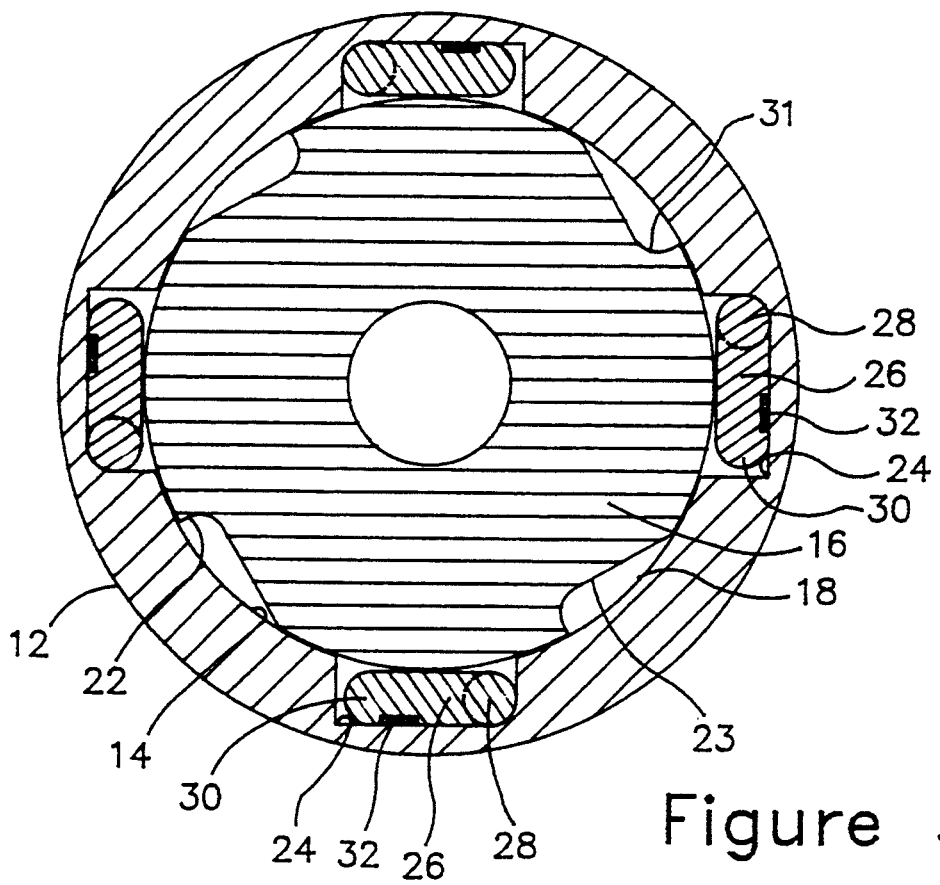
FIG. 3b is a transverse section view of the bearing assembly illustrated in FIG. 1, taken along section lines 3—3 of FIG. 2 with inner mandrel rotating clockwise.
Figure 4:
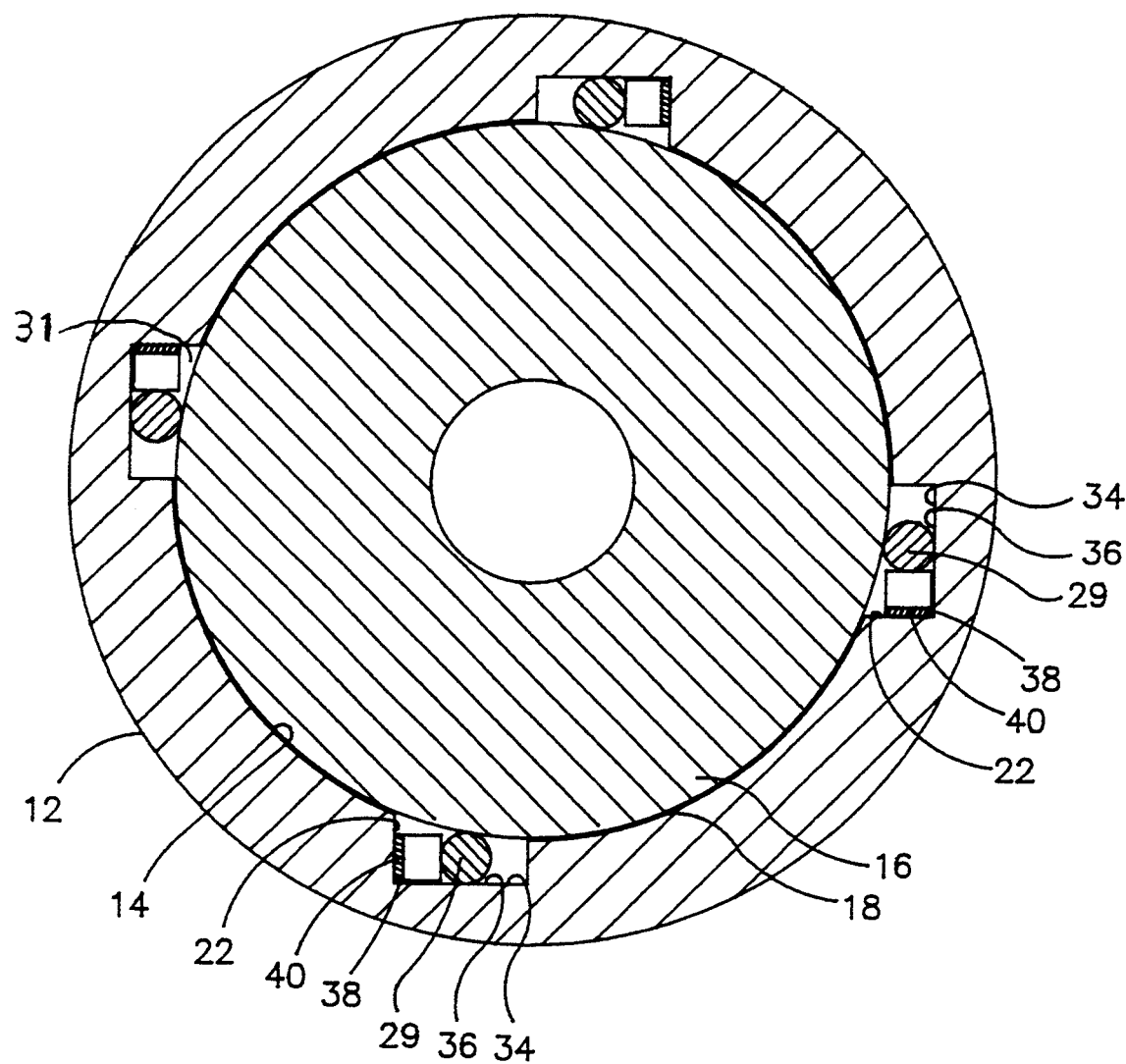
FIG. 4 is a transverse section view of an alternate embodiment of the invention.

Referring to FIG. 3a and 3b, the improvement consists of a plurality of notches 22 in exterior surface 18 of the inner mandrel 16 and a plurality of pockets 24 in interior surface 14 of housing 12. Each of notches 22 has an inclined surface 23, which is upwardly inclined from one end or base position 31. A plurality of pins 26 are disposed within pockets 24. Each of pins 26 have one end 28 pivotally secured within one of pockets 24 and a second end 30. Referring to FIG. 2, there is illustrated the manner of pivotal mounting of end 28 of pins 26 between a pair of receiving spacer elements 25. Referring to FIG. 3a and 3b, a spring 32 serves as means to exert a force biasing second end 30 of each pin 26 toward one of notches 22.

The use and operation of bearing assembly 10 will now be described with reference to FIGS. 1a through 3b. Referring to FIG. 3a, during normal operation inner mandrel 16 rotates in the first or clockwise direction relative to housing 12. As inner mandrel 16 rotates pins 26 travel up the inclined surface 23 of notches 22. Inner mandrel 16, therefore, freely rotates in the first direction. When the drill string is rotated clockwise, i.e. to the right, this has the effect of rotating inner mandrel 16 in the second direction of left or counterclockwise relative to housing 12. Referring to FIG. 3B, when inner mandrel 16 is rotated in the second direction, pins 26 travel down inclined surface 23 of notches 22 until pins 26 engage end or base position 31, thereby preventing relative rotation of inner mandrel 16 and housing 12.

Referring to FIG. 4, there is illustrated an alternative means for bringing pins into locking engagement with notches. Pins as used with the alternative embodiment are identified by reference numeral 29, and notches are identified by reference numeral 34. Notches 34 are positioned on inner surface 14 of housing 12. Each of notches 34 have a surface 36 extending from one end 38. Limited clearance is provided between interior surface 14 of housing 12 and exterior surface 18 of inner mandrel 16. Exterior surface 18 of inner mandrel 16 and surface 36 of notches 34 converge away from end 38. The clearance provided in each of notches 34 at end 38 exceeds the diameter of pins 29. A pin 29 is placed in each of notches 34 biased away from end 38 by a spring 40.

The use and operation of the alternate embodiment will now be described. Spring 40 maintains pin 29 in constant engagement with exterior surface 18 of inner mandrel 16 and surface 36 of notch 34. Pins 29 travel along surface 36 to end 38 of notch 34 upon relative rotation of the inner mandrel and housing in the first or clockwise direction. The depth of notches 34 at base 38 exceeds the diameter of pins 29 permitting pins 29 sufficient room to rotate. This permits unimpeded relative rotation of housing 12 and inner mandrel 16. However, upon the relative rotation of inner mandrel 16 and housing 12 in the second or counterclockwise direction, pins 29 travel along surface 36 of notches 34 until pins 29 become wedged between surface 36 and exterior surface 18 of inner mandrel 16, thereby preventing relative rotation of inner mandrel 16 and housing 12.

It will be apparent to one skilled in the art that modifications may be made to the illustrated embodiment without departing from the spirit and scope of the invention as defined by the claims.

The embodiments of the invention in which an exclusive property or privilege is claimed are defined as follows:

1. An improvement in a bearing assembly for a downhole motor, the bearing assembly consisting of a cylindrical housing having an interior surface, a cylindrical inner mandrel having an exterior surface telescopically received within the housing, bearing means disposed between the interior surface of the housing and the exterior surface of the inner mandrel thereby facilitating relative rotation of the housing and inner mandrel while bearing axial and radial loading, the improvement comprising:

a. a plurality of notches in one of the exterior surface of the inner mandrel and the interior surface of the housing, the notches being upwardly inclined from a base; and
   b. a plurality of pins disposed within pockets in the other of the housing and the inner mandrel, each pin having one end pivotally secured within the pocket and a second end, biasing means being provided to exert a force biasing the second end of the pins toward the notches, such that the pins travel freely up the incline on the notches upon relative rotation of the inner mandrel and housing in the first direction and the pins travel down the incline on the notches until the pins engage the base of the notch upon the relative rotation of the inner mandrel and the housing in the second direction, thereby preventing relative rotation of the inner mandrel and the housing.

2. An improvement is a bearing assembly for a downhole motor, the bearing assembly consisting of a cylindrical housing having an interior surface, a cylindrical inner mandrel having an exterior surface telescopically received within the housing, bearing means disposed between the interior surface of the housing and the exterior surface of the inner mandrel thereby facilitating relative rotation of the housing and inner mandrel while bearing axial and radial loading, the improvement comprising:

a. a plurality of notches in one of the exterior surface of the inner mandrel and the interior surface of the housing, the notches being upwardly inclined from a base; and
   b. a plurality of pins disposed between the exterior surface of the inner mandrel and the interior surface of the housing, the depth of the base of each notch exceeding the diameter of the pins, biasing means being provided between each of the pins and the base of each of the notches to exert a forcer biasing the pins up the incline of the notch, such that the pins travel toward the base of the notch where the pins can rotate freely upon relative rotation of the inner mandrel and housing in the first direction and the pins travel up the incline of the notches until the pins become wedged between the interior surface of the housing and the exterior surface of the inner mandrel upon the relative rotation of the inner mandrel and the housing in the second direction, thereby preventing relative rotation of the inner mandrel and the housing in the second direction.

3. An improvement in a bearing assembly for a downhole motor, the bearing assembly consisting of a cylindrical housing having an interior surface, a cylindrical inner mandrel having an exterior surface telescopically received within the housing, bearing means disposed between the interior surface of the housing and the exterior surface of the inner mandrel thereby facilitating relative rotation of the housing and inner mandrel while bearing axial and radial loading, the improvement comprising:

a. a plurality of notches in one of the exterior surface of the inner mandrel and the interior surface of the housing, the notches being upwardly inclined from a base; and
   b. a plurality of pins disposed within pockets in the other of the housing and the inner mandrel, each pin having one end received within one of the pockets and a second end, biasing means being provided to exert a force biasing the second end of the pins toward the notches, such that the pins travel freely up the incline on the notches upon relative rotation of the inner mandrel and housing in the first direction and the pins travel down the incline on the notches until the pins engage the base of the notch upon the relative rotation of the inner mandrel and the housing in the second direction, thereby preventing relative rotation of the inner mandrel and the housing.

* * * * *